United States Patent [19]

Gilead

[11] 4,095,750
[45] Jun. 20, 1978

[54] WATER CONDUIT

[76] Inventor: Gideon Gilead, 5 Nicaragua Street, Jerusalem, Israel

[21] Appl. No.: 621,742

[22] Filed: Oct. 14, 1975

[51] Int. Cl.² ............................................. B05B 15/00
[52] U.S. Cl. .................... 239/542; 239/547; 138/103; 137/855; 61/10; 61/11
[58] Field of Search ............... 138/103, 177, 39, 44, 138/42, 178; 239/553, 554, 566, 568, 534, 542, 544, 547; 137/855, 856; 251/145, 146; 61/10, 11, 13, 12

[56] References Cited

U.S. PATENT DOCUMENTS

| B 570,382 | 4/1976 | Spencer | 239/542 |
|---|---|---|---|
| 986,940 | 3/1911 | Osborne | 61/10 |
| 1,759,330 | 5/1930 | Van Horne | 61/10 |
| 2,771,320 | 11/1956 | Korwin | 61/12 |
| 3,114,579 | 12/1963 | Isenbarger | 137/855 |
| 3,293,861 | 12/1966 | Hinde | 61/12 |
| 3,422,626 | 1/1969 | Hanrahan | 61/10 |
| 3,917,169 | 11/1975 | Harmony | 239/542 |

Primary Examiner—Richard E. Aegerter
Assistant Examiner—John W. Shepperd
Attorney, Agent, or Firm—Weingarten, Maxham & Schurgin

[57] ABSTRACT

A water conduit of flexible material serves as an irrigation device or as a drainage pipe. At regular or irregular distance from one another cuts are made in the wall of the conduit resulting in tongue like portions which adhere to the wall of the conduit along an uncut portion. These tongues are movable out of the plane of the wall and have an outer surface which is smaller in area than the inner surface thereof.

8 Claims, 5 Drawing Figures

WATER CONDUIT

FIELD OF THE INVENTION

The present invention relates to water conduits which may serve different purposes and inter alia may be used also as drip or trickle irrigation arrangements. Another instance of use of the new conduits is that of drainage pipes.

Drip or trickle irrigation devices are well known. These are devices which are attached to a feed line and which emit a steady trickle of water or dispense the water drop wise.

BACKGROUND OF THE INVENTION

It has also been suggested already to provide holes in plastic conduits and permit the water to trickle from those holes. Further, it is known to insert nozzles into holes made in the wall of conduits, such nozzles emitting a steady trickle of water.

Drainage pipes are conduits which have holes in the walls thereof or whereof the walls are porous. Such pipes are laid out underground, water in the soil e.g., in swampy terrain, percolates into the pipes and is conducted to a point of assembly.

The plastic conduits provided with outlet ports for trickle or dropwise emission of water have the disadvantage that they become frequently clogged by impurities in the water, the same is the case with nozzles provided on water conduits. This is likely to occur with drainage pipes.

OBJECTS OF THE INVENTION

It is the object of the present invention to provide an arrangement which at the same time serves as feed line and either as emitter of a trickle or a dropwise water emission or as drainage pipe and which is easily cleaned or is self cleaning. It is a further object of the invention to provide such conduits which can be manufactured at very low cost.

SHORT SUMMARY OF THE INVENTION

According to the invention, the new conduit comprises an elastic hose, such as a plastic or rubber hose in which, at regular or irregular distances from one another cuts are made resulting in tongue like portions which adhere to the wall along an uncut portion and which are movable out of the plane of the wall of the conduit, the said tongues having an outer surface which is smaller than the inner surface thereof, thus resulting in an obliquity of the side edges of the said tongue portions, a small cut out or nick being provided in the edge of the tongue or alternatively, in the edge of the wall extending around the tongue, or providing a protrusion on the edge surrounding the tongue.

The said tongues may be of whatever configuration, they may be semi circular or almost circular, they may be triangular or rectangular. Their side edges may be plain or curved or have a rib extending around the edge face and mating with a groove in the wall of the conduit edge surrounding the said tongue.

SHORT DESCRIPTION OF DRAWINGS

The drawing shows the invention by way of example and schematically.

FIGS. 2-5 show variations of the invention.

DESCRIPTION OF PREFERRED EMBODIMENTS

Figure 1:
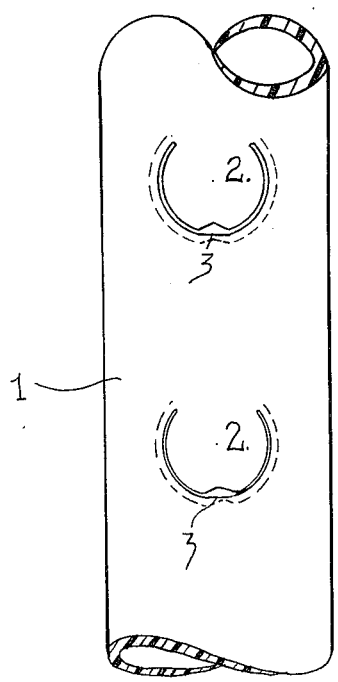
FIG. 1 is a portion of water conduit according to the invention.
Figure 2:
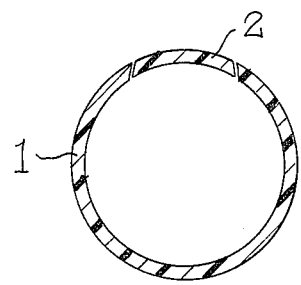
FIG. 2 is a cross section thereof.

In plastic or other flexible tubes indicated by 1 there are cut at regular or irregular distances circular cuts as shown in FIG. 1, or of any other configuration resulting in part of the wall of the hose being severed from the latter and forming a tongue-like flap indicated by the numeral 2. As can be seen, the cut is oblique to the perpendicular so that the circumferential face of the tongue, as shown in FIG. 2, is slanting outwardly from the top of the lower side of the tongue. Thus the under side of the tongue is larger than its upper surface. Into the tongue is made a small dent or nick 3 resulting in a small opening. This nick could also be made in the edge in the wall of the hose surrounding the cut 2. Alternatively, a small protrusion may be provided on the edge face of the wall surrounding the tongue, thus preventing it from fully closing the aperture, always leaving an opening through which water can drip or percolate. Such dent or protrusion is formed as a variation in one of the cut surfaces which is substantially perpendicular thereto.

The novel arrangement if used as an irrigation device functions as follows. The hose provided with a number of tongues as described is connected to a supply of water which flows through the hose under a certain pressure from the head. Under the pressure the tongues will be pressed upwardly, that is to say making it partially tight all around its circumference, except at the nick 3 through which water can trickle or drip.

If used as a drainage pipe, the hose is laid out underground, as usual; the distal ends of the tongues, since they are under no pressure from the interior of the pipe, swing in inwardly freeing the passage for water in the soil to percolate into the pipes and to flow along in the interior of the pipe.

Figure 3:
Figure 4:
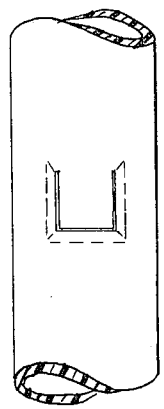
Figure 5:
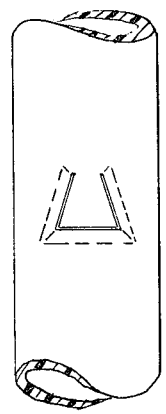

FIGS. 3, 4 and 5 illustrate cuts of a different configuration resulting in differently shaped tongues. From these examples it can easily be understood that many more forms may be found and chosen. In all cases the tongues adhere to the wall of the hose by an uncut web.

It will be seen that due to the mobility of the tongues — of whatever shape — the outlet can be cleaned easily, simply by pressing the tongue inwardly and raising it alternatingly from its normal position. In most cases of use as an irrigation device even that will not be necessary, the movement of the tongue — which it performs under the urge of flow — making the arrangement self cleaning.

Since the hoses of this kind are usually made by extrusion it would be possible to include in the plastic material during making of the hose a stiff and elastic strip extending lengthwise of the hose, this strip being cut when the tongues are cut or punched. This will increase the elasticity of the tongues.

What is claimed is:
1. A water conduit comprising:
   a hose formed of elastic materials;
   a plurality of spaced tongue-like flaps formed in the wall of said hose by means of cuts through said hose wall, each said flap being flexibly secured to said hose wall at its proximate end, the distal end thereof being separated from said wall by said cuts, said flap being resiliently movble out of position as part of said hose wall to modify the extent of the opening through said wall, said movement depend- ing in part upon the pressure of the water within said hose, said cuts being made at an oblique angle with respect to a plane through the longitudinal axis of said hose so that the inside surface of each said flap is larger than the outside surface thereof;

one of the mating cut surfaces of each said flap and said hose being formed with a dent in a direction substantially perpendicular to the cut surfaces to provide continuous access through said hose wall independently of the position of said flap.

2. The water conduit claimed in claim 1 whereby said dent is made in the edge of said flap.

3. The water conduit claimed in claim 1 whereby said dent is made in the edge of said hose wall surrounding said flap.

4. The water conduit claimed in claim 1 whereby said flaps are positioned at regular distances from one another.

5. A water conduit comprising:

a hose formed of elastic materials;

a plurality of spaced tongue-like semicircular flaps formed in the wall of said hose by means of cuts through said hose wall, each said flap being flexibly secured to said hose wall at its proximate end, the distal end thereof being separated from said wall by said cuts, said flap being resiliently movable out of position as part of said hose wall to modify the extent of the opening through said wall, said movement depending in part upon the pressure of the water within said hose, said cuts being made at an oblique angle with respect to a plane through the longitudinal axis of said hose so that the inside surface of each said flap is larger than the outside surface thereof;

one of the mating cut surfaces of each said flap and said hose being formed with a dent in a direction substantially perpendicular to the cut surfaces to provide continuous access through said hose wall independently of the position of said flap.

6. A water conduit comprising:

a hose formed of elastic materials;

a plurality of spaced tongue-like V-shaped flaps formed in the wall of said hose by means of cuts through said hose wall, each said flap being flexibly secured to said hose wall at its proximate end, the distal end thereof being separated from said wall by said cuts, said flap being resiliently movable out of position as part of said hose wall to modify the extent of the opening through said wall, said movement depending in part upon the pressure of the water within said hose, said cuts being made at an oblique angle with respect to a plane through the longitudinal axis of said hose so that the inside surface of each said flap is larger than the outside surface thereof;

one of the mating cut surfaces of each said flap and said hose being formed with a dent in a direction substantially perpendicular to the cut surfaces to provide continuous access through said hose wall independently of the position of said flap.

7. A water conduit comprising:

a hose formed of elastic materials;

a plurality of spaced tongue-like U-shaped flaps formed in the wall of said hose by means of cuts through said hose wall, each said flap being flexibly secured to said hose wall at its proximate end, the distal end thereof being separated from said wall by said cuts, said flap being resiliently movable out of position as part of said hose wall to modify the extent of the opening through said wall, said movement depending in part upon the pressure of the water within said hose, said cuts being made at an oblique angle with respect to a plane through the longitudinal axis of said hose so that the inside surface of each said flap is larger than the outside surface thereof;

one of the mating cut surfaces of each said flap and said hose being formed with a dent in a direction substantially perpendicular to the cut surfaces to provide continuous access through said hose wall independently of the position of said flap.

8. A water conduit comprising:

a hose formed of elastic materials; and a plurality of spaced tongue-like flaps formed in the wall of said hose by means of cuts through said hose wall, each said flap being flexibly secured to said hose wall at its proximate end, the distal end thereof being separated from said wall by said cut, said cut surrounding and separating from said hose wall all but said proximate end of said flap and defining at the respective ends of said cut on either side of said proximate end an opening resulting from a small amount of material being removed as a result of making said cut, said flap being resiliently movable out of position as part of said hose wall to modify the extent of the opening through said wall defined by said cut forming said flap, said movement depending in part upon the pressure of the water within said hose, said cut being made at an oblique angle with respect to a plane through the longitudinal axis of said hose so that the inside surface of each said flap is larger than the outside surface thereof, whereby when the pressure on the inside of said conduit is greater than on the outside, said flap is closed and said openings at either end of said cut provide continued communication between the inside and outside of said conduit.

* * * * *